(12) United States Patent
Henderson (10) Patent No.: US 11,761,221 B2
(45) Date of Patent: Sep. 19, 2023

(54) CHEMICAL AND BIOHAZARD VEHICLE SURVIVABILITY BARRIER SYSTEMS AND METHODS

(71) Applicant: Integrated Systems for Solutions, Inc., Huntsville, AL (US)

(72) Inventor: Robert D. Henderson, Huntsville, AL (US)

(73) Assignee: Integrated Systems for Solutions, Inc., Huntsville, AL (US)

( * ) Notice: Subject to any disclaimer, the term of this patent is extended or adjusted under 35 U.S.C. 154(b) by 0 days.

(21) Appl. No.: 17/205,852

(22) Filed: Mar. 18, 2021

(65) Prior Publication Data

US 2022/0298816 A1 Sep. 22, 2022

(51) Int. Cl.
| | | |
|---|---|---|
| E04H 15/20 | (2006.01) | |
| E04H 1/12 | (2006.01) | |
| E04H 15/06 | (2006.01) | |
| E04H 15/14 | (2006.01) | |
| E04H 15/32 | (2006.01) | |
| B60H 3/00 | (2006.01) | |

(52) U.S. Cl.
CPC ......... *E04H 1/1277* (2013.01); *B60H 3/0071* (2013.01); *E04H 15/06* (2013.01); *E04H 15/14* (2013.01); *E04H 15/20* (2013.01); *E04H 15/32* (2013.01); *E04H 2015/201* (2013.01); *E04H 2015/206* (2013.01)

(58) Field of Classification Search
CPC .. E04H 15/20; E04H 2015/201; E04H 2/1277
See application file for complete search history.

(56) References Cited

U.S. PATENT DOCUMENTS

| | | | | |
|---|---|---|---|---|
| 2,591,829 A * | 4/1952 | Katzenmeyer | .......... | E04H 15/20 52/2.21 |
| 2,955,606 A * | 10/1960 | Walker | ..................... | E04H 15/20 52/2.21 |
| 4,736,762 A * | 4/1988 | Wayman | ................. | A61G 3/001 128/846 |
| 7,757,689 B2 * | 7/2010 | Chang | ................... | B08B 15/026 128/202.13 |
| 2009/0084043 A1* | 4/2009 | Tarbet | ..................... | E04H 15/20 52/741.1 |
| 2015/0017897 A1* | 1/2015 | Wiliams | ................ | E04H 1/1205 454/51 |
| 2015/0337526 A1* | 11/2015 | Cantin | ...................... | E04H 3/08 52/63 |
| 2016/0192783 A1* | 7/2016 | Kelly | ...................... | E04H 15/50 135/96 |

FOREIGN PATENT DOCUMENTS

| | | | | |
|---|---|---|---|---|
| EP | 0345600 A1 * | 12/1989 | ............. | E04H 15/20 |
| WO | WO-2012147080 A1 * | 11/2012 | ........... | E04H 15/008 |

\* cited by examiner

*Primary Examiner* — Noah Chandler Hawk
(74) *Attorney, Agent, or Firm* — DENNEN IP LAW, LLC (57) ABSTRACT

A chemical/biological vehicle survivability barrier (CVSB) has an inflatable air beam shelter (IABS), also referred to as a tunnel-like enclosure, for inserting and coupling to the interior of a vehicle. The CVSB further has at least one air handling and power unit (AHPU) coupled to an exterior fitting of the IABS. The AHPU withdraws potentially contaminated air from inside the tunnel-like enclosure, filtrates the air by removing contaminants from the air withdrawn, and returns the filtrated air back into the tunnel-like enclosure.

23 Claims, 10 Drawing Sheets

CHEMICAL AND BIOHAZARD VEHICLE SURVIVABILITY BARRIER SYSTEMS AND METHODS

BACKGROUND

In military tactics, extraction (also exfiltration or exfil) is the process of removing personnel and equipment from a theater when it is considered imperative that they be immediately relocated out of a hostile environment and taken to an area either occupied or controlled by friendly personnel.

Oftentimes, troops and equipment are contaminated in the field. That is, the troops and equipment are often exposed to contamination or biohazards.

In extracting the troops and equipment from the theater that have been exposed to contamination and biohazard, aircraft often becomes exposed to contamination and biohazard. To decontaminate the aircraft, the aircraft must be taken to a special facility, of which there are very few, to get decontaminated. Further, the decontamination of the aircraft is costly.

Presently, the interior of the specific airlift assets from the effects of chemical/biological cross-contamination when transporting chemical/biological contaminated personnel, equipment and cargos is unprotected. Notably, troops board aircrafts after they have been contaminated, and the cross-contamination renders the aircraft useless for future use.

DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present description is of a chemical/biological vehicle survivability barrier (CVSB) system in accordance with an embodiment of the present disclosure that protects individuals from contaminants. The contaminants from which the CVSB may protect individuals includes chemical/biological warfare agents, or any disease-causing microbe, e.g., bacteria and viruses. The CVSB system protects a vehicle, e.g., an aircraft or a land vehicle, from contaminants, which is a function of special fabric and filter elements contained in an AHPU. That is, if contaminated personnel enter the vehicle without a barrier, the aircraft will become contaminated with the contaminants. If an aircraft becomes contaminated, the procedure for decontaminating the vehicle is onerous and costly. Thus, the CVSB prevents contaminated personnel and contaminated cargo from contaminating the vehicle to avoid such decontamination procedures.

The CVSB comprises an inflatable tunnel-like enclosure, also known as the inflatable air beam shelter (IABS), that when assembled is not necessarily air-tight. In this regard, the inflatable tunnel-like enclosure comprises a door that is closed via a zipper. That is, some air may be able to get into the tunnel-like enclosure. However, the AHPU provides air suction (negative pressure inside the tunnel-like enclosure, which ensures that when a leak is present, no contaminated air gets out of the tunnel-like enclosure. Instead, clean air from the vehicle cabin is sucked into the tunnel-like enclosure.

The tunnel-like enclosure comprises seats on which potentially contaminated personnel may sit for transport. The seats extend longitudinally down the inside walls of the tunnel-like enclosure. In one embodiment, the seats are cylindrically-shaped.

The tunnel-like enclosure comprises a communication panel so that occupants can communicate with personnel outside the tunnel-like enclosure, e.g., with a pilot or driver and for communication by personnel with persons inside the tunnel-like enclosure. In this regard, the tunnel-like enclosure comprises a communication cable that extends to a communication apparatus of the vehicle, and on the inside of the tunnel-like enclosure 100 is a microphone. This enables occupants of the tunnel-like enclosure to talk to the vehicle operators and crew members.

Further, the tunnel-like enclosure comprises two air handling and power units (AHPU). Each AHPU comprises a blower that supplies filtered air to the tunnel-like enclosure and each comprises a blower for inflating the tunnel-like enclosure. The AHPU also provides lighting within the tunnel-like enclosure. Furthermore, each AHPU comprises a filtration system. That is, each AHPU draws potentially contaminated air from the tunnel-like structure, filters the contaminated air, and delivers the filtered air back to the vehicle interior.

Note that the objective is to protect the interior space and surfaces of the vehicle. In this regard, contaminated personnel and cargo may be in the tunnel-like enclosure. The tunnel-like enclosure is configured to reduce and eliminate the effects of cross-contamination of the vehicle when transporting contaminated personnel, equipment, and cargo.

Figure 1:
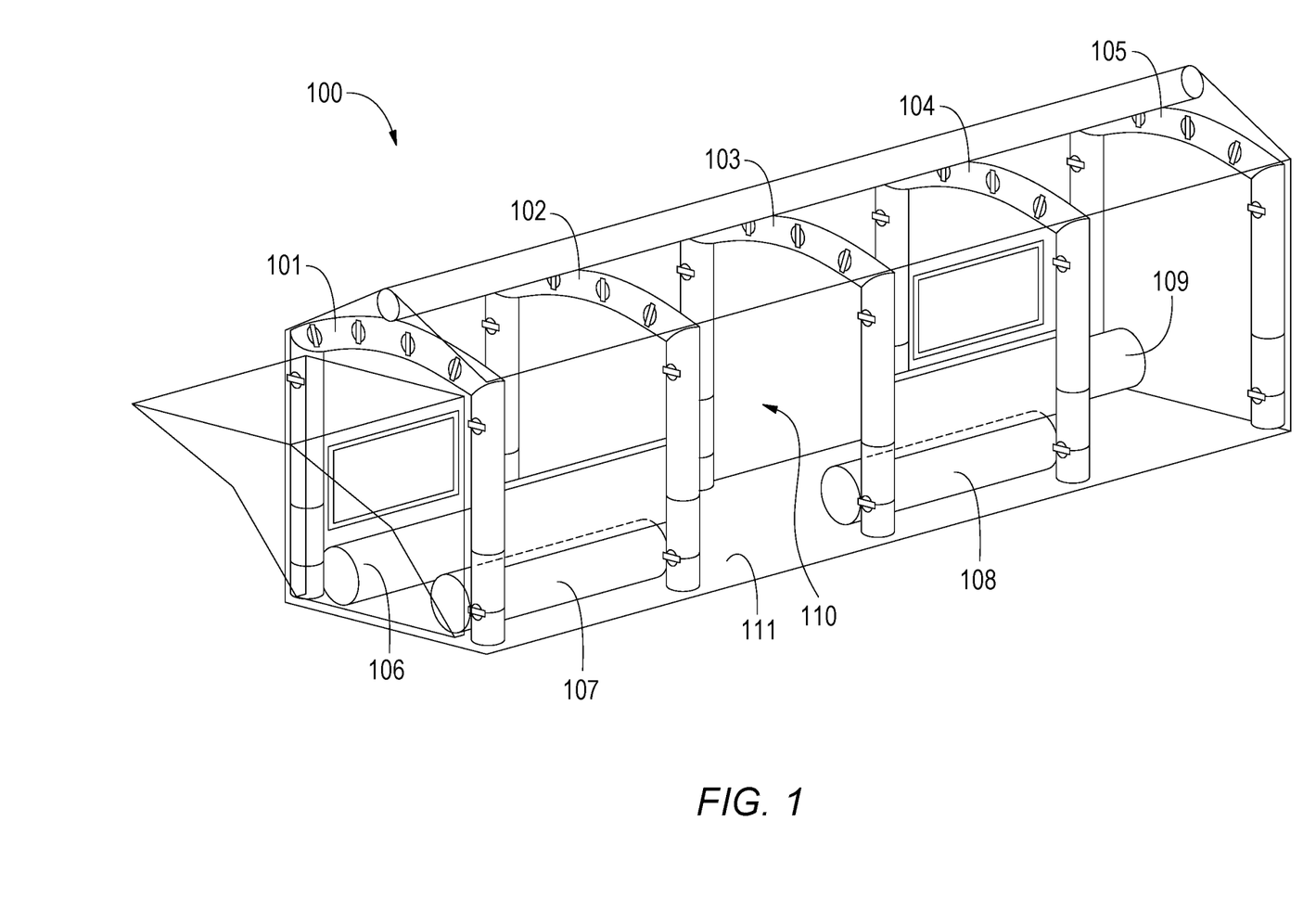
FIG. 1 is a transparent, perspective view of a cabin of a vehicle having a chemical/biological vehicle survivability barrier (CVSB) system deployed within the vehicle in accordance with an embodiment of the present disclosure.

FIG. 1 is a perspective view of a tunnel-like enclosure 100, also known as the Inflatable Air Beam Shelter (IABS), in accordance with an embodiment of the present disclosure. The tunnel-like enclosure 100 may be installed in any type of vehicle, e.g., aircraft or land vehicle, configured to transport potentially hazardous people or cargo.

Note that the tunnel-like enclosure is shown as transparent in FIG. 1 to fully show the features of the tunnel-like enclosure 100. The tunnel-like enclosure 100 is comprised of a pliable material that is easily inflated yet is strong to withhold carrying of personnel. Further, it is composed of a material that resists transfer of chemical/biological/viral contaminants. As will be described herein, the tunnel-like enclosure 100 installs and inflates in less than thirty minutes.

The tunnel-like enclosure 100 comprises inflatable air beam arches 101-105 that are coupled to an inflatable ridge beam 112. Note that five arches 101-105 are shown for exemplary purposes. More or fewer arches may be used in other embodiments. The arches 101-105 provide vertical support for the tunnel-like enclosure 100, and arches 101-105 are coupled to the inside walls 110 and floor 111 of the tunnel-like enclosure 100.

The tunnel-like enclosure 100 comprises removeable seats 106-109. The seats are removably affixed to the walls 110 and floor 111 of the tunnel-like structure 100. If the seats 106-109 are not needed, they may be removed to make room for additional personnel or cargo.

Figure 2:
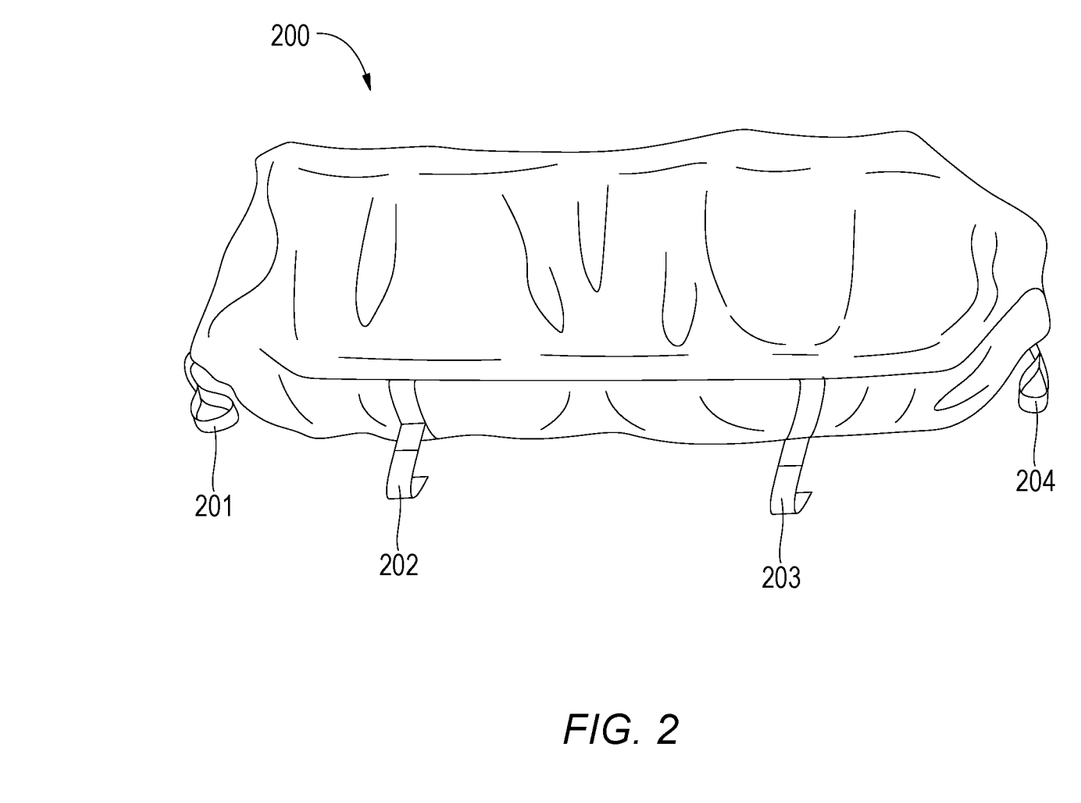
FIG. 2 is a perspective view of the tunnel like enclosure of the CVSB of FIG. 1 positioned in a vehicle in an undeployed scenario in accordance with an embodiment of the present disclosure.

With reference to FIG. 2, the tunnel-like enclosure 100 (FIG. 1) is initially stored and transported in a soft transport bag 200 so that it can be transported easily where needed. In this regard, the soft transport bag 200 comprises a plurality of hook and loop fasteners 201-203 configured for opening the bag 200.

Note that while four loop fasteners 201-203 are shown, there may be more or fewer fasteners in other embodiments. For example, there may be hook and loop fasteners on the other side of the soft transport bag 200 that are not shown in the view shown in FIG. 2.

In operation, a user unfastens the hook and loop fasteners to open the soft transport bag 200. Once the soft transport bag 200 is open, the user removes the tunnel-like enclosure 100 (FIG. 1) from the soft transport bag 200. After removal of the tunnel-like enclosure 100 from the soft transport bag 200, the user positions the tunnel-like enclosure 100 on the vehicle floor (not shown) near an ingress/egress opening (not shown), e.g., on the cargo floor near an aircraft ramp (not shown).

The tunnel-like enclosure 100 comprises at least four (4) exposed hooks (not shown), which are nearest the ingress/egress opening. The user then unrolls the tunnel-like enclosure 100, which is in a bundle after removing it from the soft transport bag 200, toward the front of the vehicle.

Figure 3:
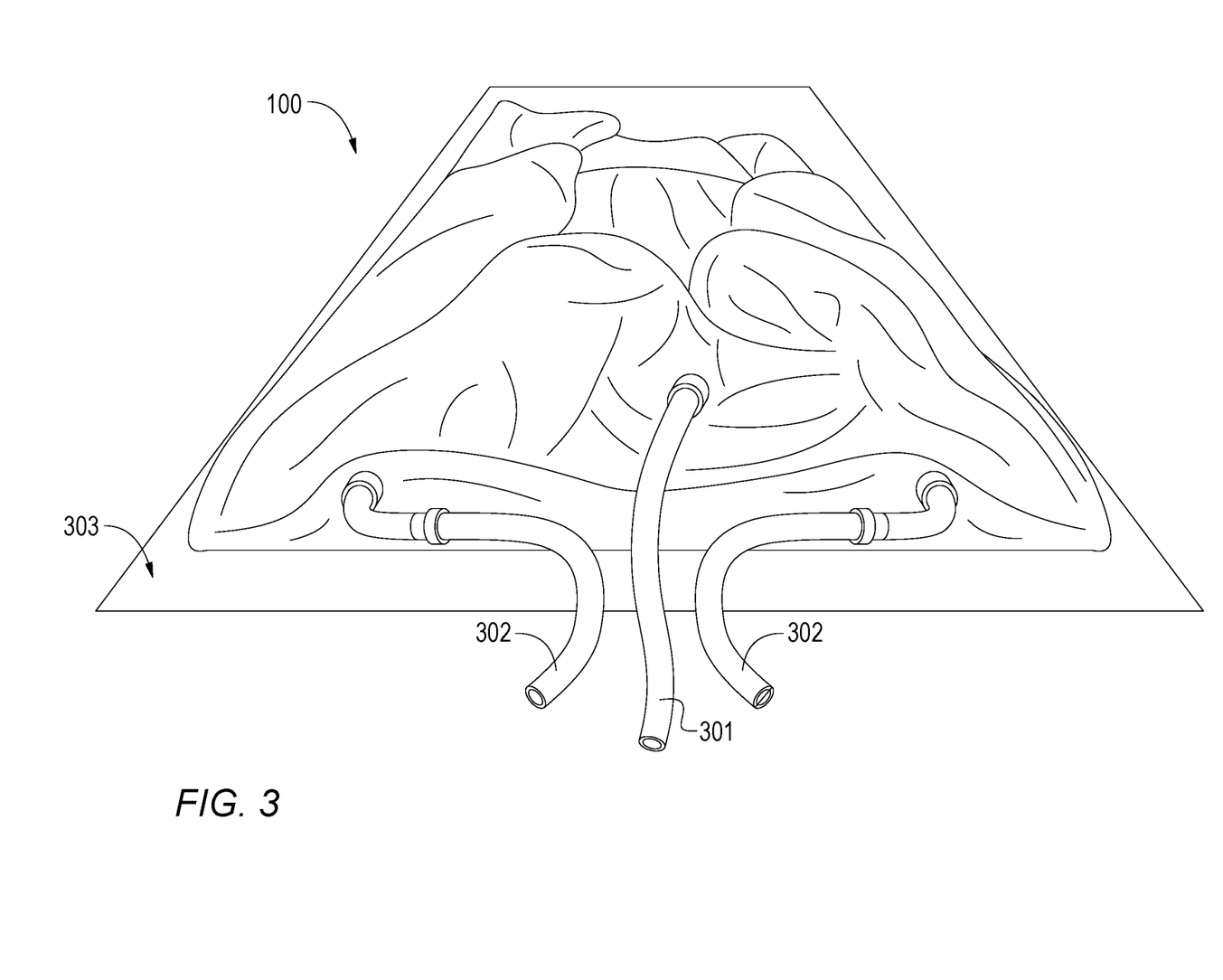
FIG. 3 is a perspective view of the IABS while personnel prepare to inflate it for use on a vehicle.

FIG. 3 is a perspective view of the tunnel-like enclosure 100 after it has been removed from the soft transport bag 200 (FIG. 2), placed on a floor 303 of a vehicle, and unrolled toward the front of the vehicle.

Note that when the tunnel-like enclosure 100 is placed on the flooring 303 of the vehicle, it is fixedly coupled to the floor with latches (not shown) that attach to apertures in the flooring 303 to secure the tunnel-like enclosure 100 to the vehicle.

There are two hoses that inflate the tunnel-like structure 100. There is a hose 301 that inflates the shelter. Further, there is a hose 302 that inflates the seats 106-109 (FIG. 1). Note that there is a separate fitting to inflate the seats 106-109 on each side of the tunnel-like structure 100.

Figure 4:
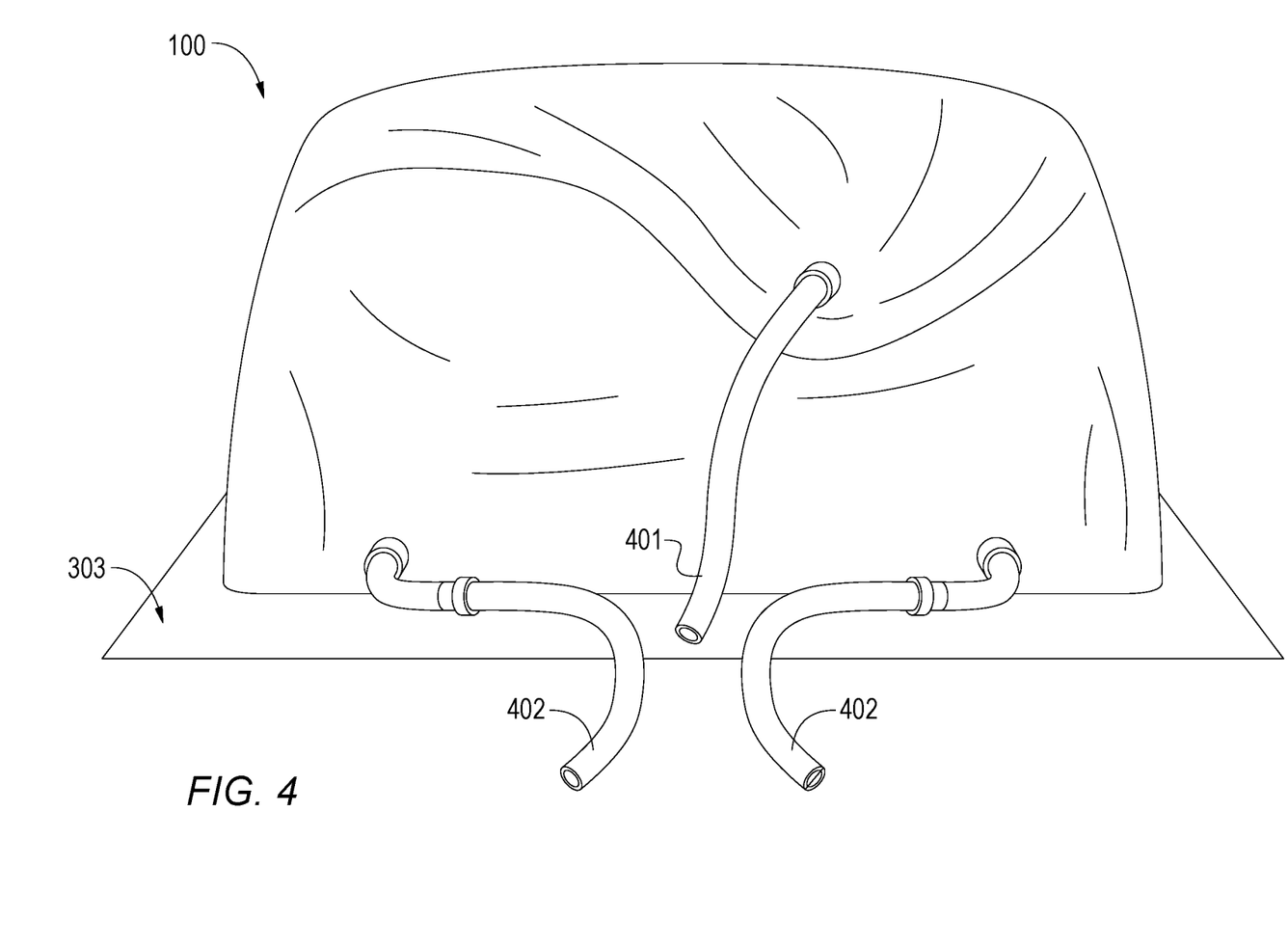
FIG. 4 is a perspective view of the IABS as it is being deployed.

FIG. 4 shows the tunnel-like structure 100 as it is being inflated. The tunnel-like structure is coupled to one or more tubes 301, 302. The tubes 301, 302 coupled to an AHPU and compressed inflation air is provided by the AHPU. The inflation hoses 301, 302 connect to the AHPU and compressed inflation air is provided by the AHPU. That is, once the tunnel-like structure 100 has been unrolled, air is forced through tubes 301, 302 to inflate the tunnel-like structure 100. As air fills the tunnel-like enclosure 100, the tunnel-like enclosure 100 takes the form of a tunnel.

Figure 5:
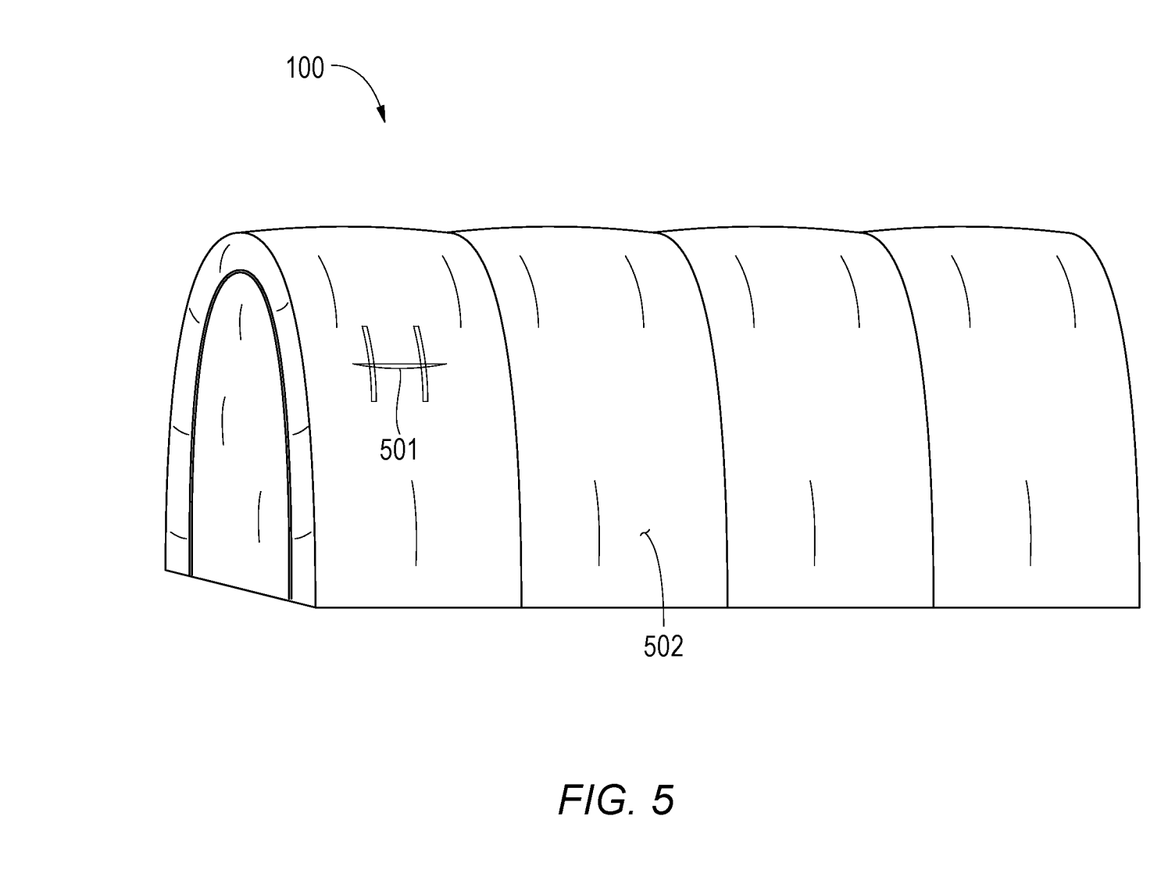
FIG. 5 is a perspective view of the IABS deployed in accordance with an embodiment of the present disclosure.

FIG. 5 shows the tunnel-like enclosure 100 completely inflated. Note that the seats 106-109 (FIG. 1) within the tunnel-like structure 100 are removable, and the seats each have multiple seatbelts to accommodate multiple passengers (not shown). Also, the seats 106-109 (FIG. 3) can be removed at any time to make room for additional personnel to cargo.

The tunnel-like enclosure 100 comprises at least one pass-through pouch 501. The pass-through pouch 501 may be used to transfer water, food, or medicines into the tunnel-like structure 100 to the occupants of the tunnel-like enclosure 100 without transferring contaminants to personnel or the air space outside the IABS. Also, the skin 502 of the tunnel-like enclosure 100 is such that it can resist transfer of contaminants, including COVID-19.

Within the tunnel-like enclosure 100 is a plurality of light-emitting diodes (LEDs) (not shown). During operation, when personnel is secured in the tunnel-like enclosure 100, light may be provided to the personnel via the LEDs. Also, when necessary, the tunnel-like structure 100 may operate in blackout mode, where no light exits the tunnel-like enclosure 100.

Figure 6:
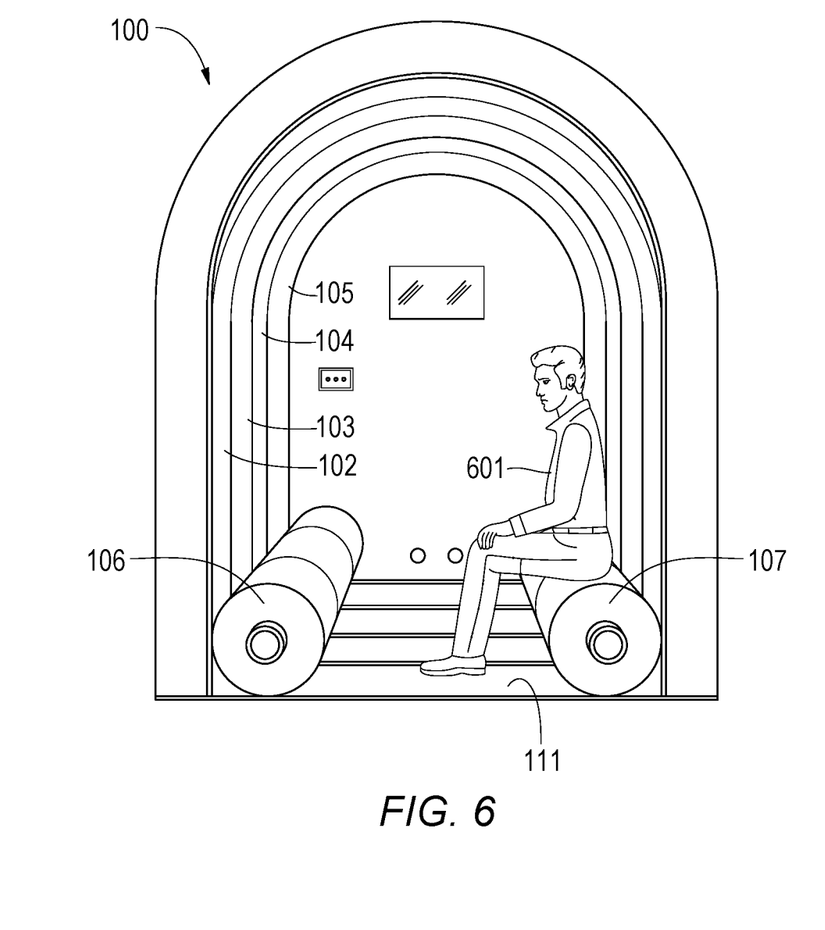
FIG. 6 is a perspective view of the IABS deployed in accordance and contained in a vehicle in accordance with an embodiment of the present disclosure.

FIG. 6 is a perspective view of an inside of the tunnel-like enclosure 100. The tunnel-like enclosure 100 comprises the plurality of arches 103-106 that provide vertical support to the tunnel-like enclosure 100. Further, the tunnel-like enclosure 100 comprises seats 106 where personnel 601 may sit during transport. As described above, the seat 106 is removably coupled to the walls and the floor of the tunnel-like structure 100.

Figure 7:
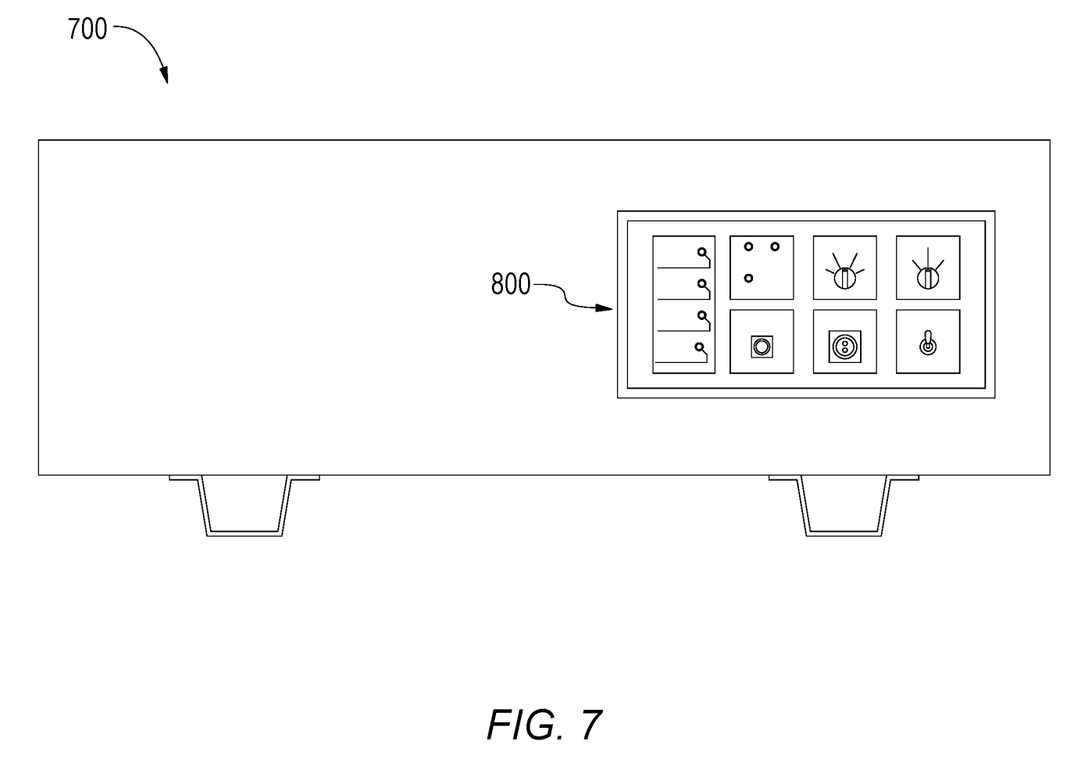
FIG. 7 shows an air handling and power unit (AHPU) used in the IABS of FIG. 1.

FIG. 7 is an AHPU 700 as described hereinabove. As noted, the tunnel-like enclosure 100 includes two (s) AHPUs 700. The AHPUs 700 draws clean air from the vehicle cabin through the inlet filter in the tunnel-like enclosure 100. In this regard, air is pumped from within the tunnel-like enclosure 100 to a filtration system (not shown) inside the AHPUs 700, creating a slight negative pressure inside the tunnel-like enclosure. The filtration system removes contaminants, from the air received from the tunnel-like enclosure 100. Once the air has been filtered, the AHPU 700 pumps the filtrated air back into the vehicle cabin thus providing a continuous source of breathable air for the occupants of the tunnel-like enclosure. In one embodiment, the AHPU 700 comprises a blower (not shown) that supplies the tunnel-like enclosure 100 filtered air into the tunnel-like enclosure 100. This process takes place without exposing the vehicle to the contaminants.

The AHPU 700 also comprises a compressor (not shown). The compressor couples to the hoses 301 (FIG. 3), 302 (FIG. 3). Through these hoses 301, 302, the compressor inflates the tunnel-like enclosure 100.

Each AHPU 700 has a battery, and each AHPU 700 has on-board ninety minutes of battery power. In the event battery power runs low, the AHPU 700 couples to the vehicle power to recharge.

Further, the AHPU 700 controls lighting to the tunnel-like enclosure 100. In this regard, the AHPU 700 provides power to the LEDs described above so that personnel in the tunnel-like enclosure 100 can see. The power to the lights can work in full bright and blackout modes.

Figure 8:
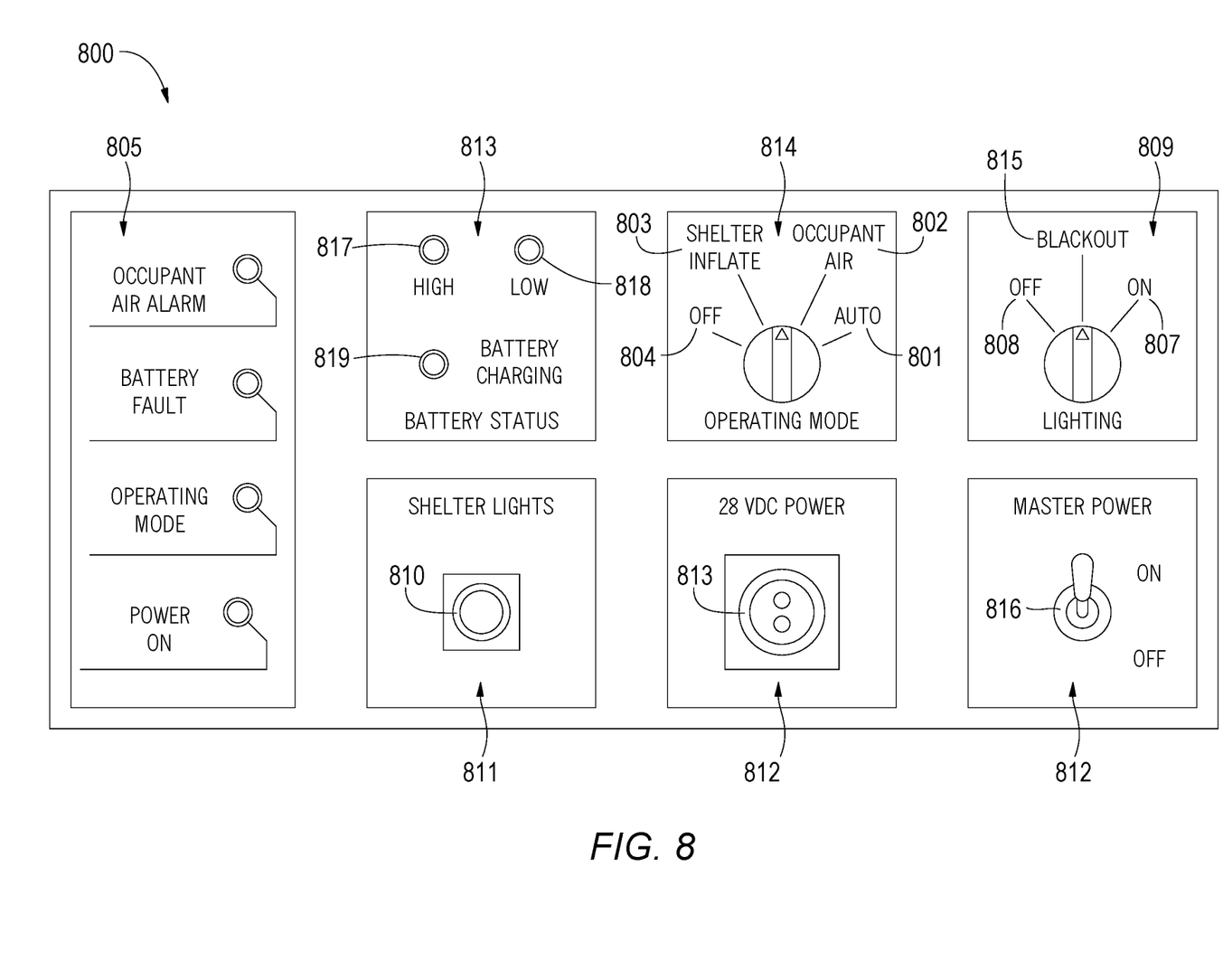
FIG. 8 is a user interface to the AHPU of the IABS in accordance with an embodiment of the present disclosure.

FIG. 8 is a control panel 800 of an AHPU 700 (FIG. 7) in accordance with an embodiment of the present disclosure. The AHPU control panel 800 has a notification panel 805. The notification panel 805 provides a notification of occupant air alarm, a battery fault, in operating mode or power on.

Notification panel 813 notifies a user whether the battery charge is high 817 or low 818. The notification panel 813 also notifies a user whether the battery is charging 819.

The "Operating Mode" controls 814 comprise a plurality of modes. In this regard, one can switch the control 805 to the "Off" position. In the "Off" position, filtration and inflation functions are not operable.

One can switch to the "Shelter Inflate" mode 803. In "Shelter Inflate" mode, the compressor is active and provides inflation air to the tunnel-like enclosure 100. One can switch to the "Occupant Air" mode 802. In "Occupant Air" mode 802, the blower is active and providing filtrated air to the occupants in the tunnel-like enclosure 100. On can switch to "Auto" mode 801. In "Auto" mode 801, the blower is active providing filtrated air to the tunnel-like enclosure 100. Further, the AHPU monitors air pressure in the inflated air beam arches. If the inflation pressure drops below a threshold number, e.g., 12 pounds per square inch (psi), the AHPU activates the compressor until pressure returns to an acceptable number, e.g., 20 psi.

The control panel 800 further comprises "Lighting" controls 809. One can switch to the "Off" mode 808, and no lights are illuminated within the tunnel-like enclosure 100. One can switch to "Blackout" mode 815, and shelter lighting compatible with night vision imaging systems (NVIS) is illuminated. One can switch to "On" mode 807 and the bright lights in the tunnel-like enclosure 100 are illuminated, and the occupants can adjust the brightness of those lights from within the tunnel-like enclosure 100.

The control panel 800 further comprises "Shelter Lights" mode 811. In this regard, an electrical cable is coupled to port 810 to provide lighting to the tunnel-like enclosure 100.

The control panel 800 further comprises "28 VDC Power" control 812. In this regard, the control is a port 813 for receiving vehicle power with a dedicated cable connected to any 28 VDC (50 Amp) power source. Thus, if no electricity is being produced by the on-board battery, power is still provided to the tunnel-like enclosure 100.

The control panel 800 further comprises a "Master Power" control 812. In this regard, when a switch 816 is set to off, no power is being provided to the tunnel-like enclosure 100. However, when the switch 816 is set to on, power is being provided to the tunnel-like enclosure 100.

Figure 9:
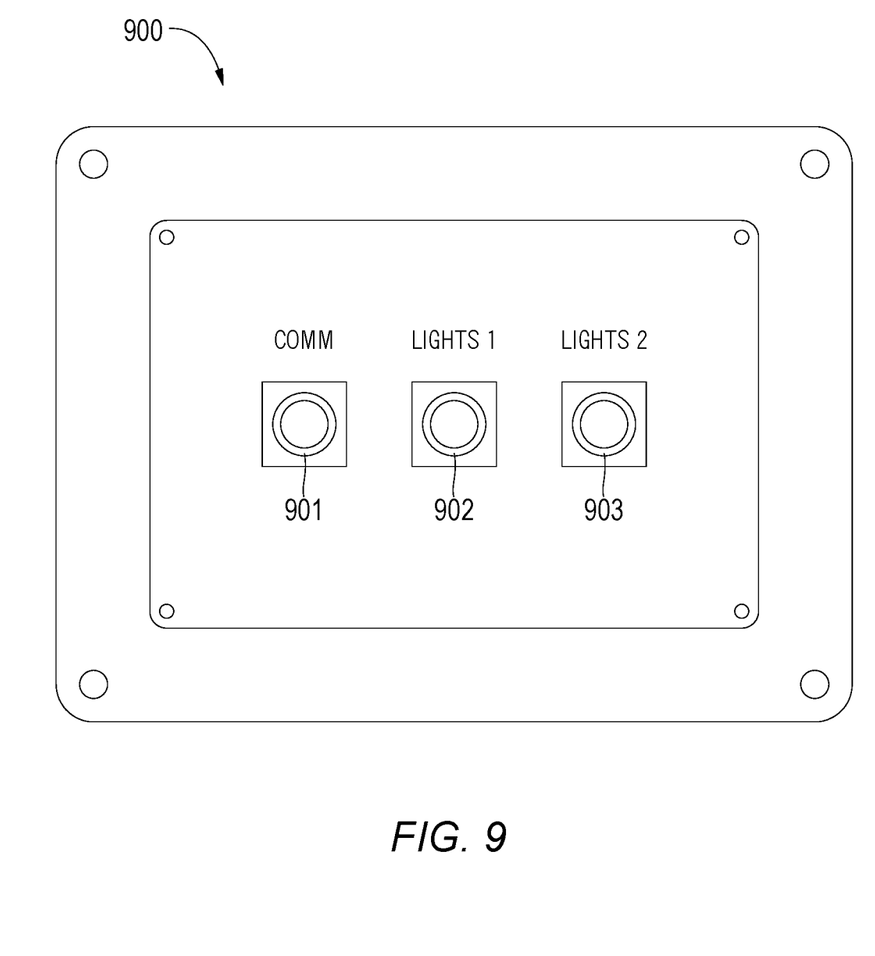
FIG. 9 shows ports on the interior of the IABS for communication cables and electricity cables for lights within the IABS.

FIG. 9 is an interface 900 on the outside of the tunnel-like enclosure 100. The interface 900 penetrates through the skin of the tunnel-like enclosure 100. It has connectors on both sides (inside and outside). Connectors on the inside are connected to a communications headset (not shown) and to the two lights. Connectors on the outside are connected to the AHPU for lighting power and to the vehicle communication system to provide communication with the vehicle crew.

The interface 900 comprises a communications port 901. As described hereinabove, the communications port 901 receives a cable that enables occupants in the tunnel-like enclosure 100 to communicate with vehicle operators (not shown) outside the tunnel-like enclosure 100. The communications port 901 also allows vehicle operators to communicate with occupants in the tunnel-like enclosure 100.

The interface 900 further comprises light ports 902 and 903. The light ports 902 and 903, when connected to cables, provide electricity from the AHPU 700 (FIG. 7) to the LEDs within the tunnel-like enclosure 100.

Figure 10:
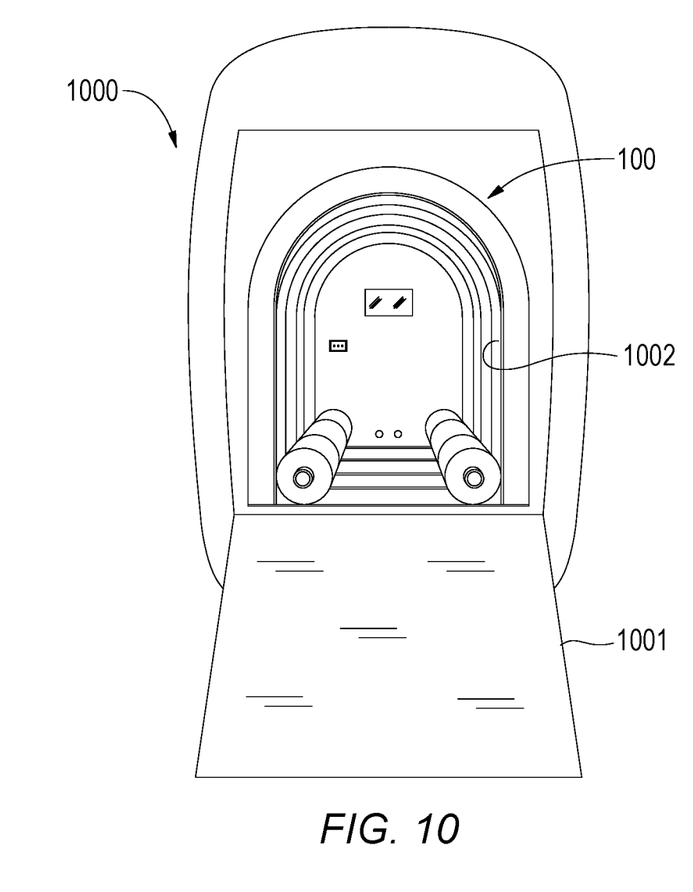
FIG. 10 is a perspective view of a ramp in accordance with an embodiment of the present disclosure that is coupled to the IABS and the outside of the vehicle to keep the ramp secure.

FIG. 10 is a backend view of a vehicle 1000 showing the tunnel-like enclosure 100 installed therein. The tunnel-like enclosure 100 is inflated such that potentially contaminated personnel (not shown) may sit in the tunnel-like enclosure 100. Further, potentially contaminated cargo (not shown) can be placed within the tunnel-like enclosure 100 as well.

The tunnel-like enclosure 100 creates a barrier between potentially contaminated personnel and cargo. It is easy to install and uninstall by simply inflating the tunnel-like enclosure 100 then deflating the tunnel-like enclosure 100, as described. The tunnel-like enclosure 100 comprises the means for communication and lighting, as described. Further, the tunnel-like enclosure 100 has the seats, as described, on which potentially contaminated personnel can sit.

The ramp cover 1001 extends outwardly to prevent contamination of the vehicle when loading personnel and cargo into the tunnel-like enclosure 100. Once all personnel and cargo are loaded, the ramp cover 1001 is discarded. A clean ramp is affixed to the vehicle to prevent contamination of the vehicle when unloading personnel and cargo.

The invention claimed is:

1. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby inflating the tunnel-like enclosure,
   wherein the tunnel-like enclosure comprises a pass-through pouch used to transfer water, food, or medicines into the tunnel-like enclosure to the occupants of the tunnel-like enclosure without transferring contaminants into or out of the tunnel-like enclosure.

2. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby inflating the tunnel-like enclosure,
   wherein the tunnel-like enclosure comprises the first hose coupled to an end of the tunnel-like enclosure configured for delivering air to the tunnel-like enclosure and inflating the ridge beam and arches of the tunnel-like enclosure, and the first hose is further configured to remove air from the tunnel-like enclosure ridge beam and arches to deflate the tunnel-like enclosure.

3. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby inflating the tunnel-like enclosure, wherein the tunnel-like enclosure further comprises at least one second hose configured for delivering air to seats coupled inside the tunnel-like enclosure.

4. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby inflating the tunnel-like enclosure,
   wherein the tunnel-like enclosure further comprises at least one second hose configured for delivering air to seats coupled inside the tunnel-like enclosure and the seats are cylindrically-shaped.

5. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby inflating the tunnel-like enclosure,
   wherein the tunnel-like enclosure is coupled to a first port and a second port of the AHPU and the AHPU comprises a control panel comprising a master power switch and an operating mode knob, and to inflate the tunnel-like enclosure, the master power which is set to the on position and the operating mode knob is set to the shelter inflate position.

6. A chemical/biological warfare agent and biological/viral illness vehicle survivability barrier (CVSB), comprising:
   a tunnel-like enclosure configured for inserting within and coupling to an interior of a vehicle;
   at least one air handling and power unit (AHPU) coupled to an exterior of a tunnel-like enclosure, the AHPU comprising a first hose configured for withdrawing potentially contaminated air from the tunnel-like enclosure, a filtration system configured for removing contaminants from the air withdrawn, and a second hose configured for delivering the air back to the tunnel-like enclosure thereby deflating the tunnel-like enclosure,
   wherein the AHPU is powered from the vehicle.

7. The CVSB of claim 6, wherein the tunnel-like enclosure comprises seats coupled to the inside sides of the air-tight inflatable tent.

8. The CVSB of claim 7, wherein the seats are cylindrical.

9. The CVSB of claim 6, wherein the tunnel-like enclosure comprises an inflatable ridge beam.

10. The CVSB of claim 9, wherein the tunnel-like enclosure comprises a plurality of inflatable arches that couple to the inflatable ridge beam.

11. The CVSB of claim 6, further comprising a ramp cover configured to load personnel and cargo in the tunnel-like enclosure.

12. The CVSB of claim 6, wherein the tunnel-like enclosure comprises the first hose coupled to an end of the tunnel-like enclosure configured for delivering air to the tunnel-like enclosure and inflating the ridge beam and arches of the tunnel-like enclosure.

13. The CVSB of claim 12, wherein the first hose is further configured to remove air from the tunnel-like enclosure ridge beam and arches to deflate the tunnel-like enclosure.

14. The CVSB of claim 6, wherein the tunnel-like enclosure further comprises at least one second hose configured for delivering air to seats coupled inside the tunnel-like enclosure.

15. The CVSB of claim 14, wherein the seats are cylindrically-shaped.

16. The CVSB of claim 6, wherein the tunnel-like enclosure is configured to be deflated, broken down, and stored within a soft transport bag.

17. The CVSB of claim 16, wherein the soft transport bag comprises hook and loop fasteners for retaining the tunnel-like enclosure within the soft transport bag.

18. The CVSB of claim 6, wherein the tunnel-like enclosure is arch-shaped.

19. The CVSB of claim 6, wherein the tunnel-like enclosure comprises a pass-through pouch used to transfer water, food, or medicines into the tunnel-like enclosure to the occupants of the tunnel-like enclosure without transferring contaminants into or out of the tunnel-like enclosure.

20. The CVSB of claim 6, wherein the tunnel-like enclosure is coupled to a first port and a second port of the AHPU.

21. The CVSB of claim 20, wherein the AHPU comprises a control panel comprising a master power switch and an operating mode knob, and to inflate the tunnel-like enclosure, the master power which is set to the on position and the operating mode knob is set to the shelter inflate position.

22. The CVSB of claim 6, wherein the tunnel-like enclosure comprises a panel coupled to an outside of the tunnel-like enclosure.

23. The CVSB of claim 22, wherein the panel comprises light ports configured for receiving power cables that deliver light to the inside of the tunnel-like enclosure and comprises a communication port configured for receiving a cable so that occupants in the tunnel-like enclosure can communicate with personnel outside the tunnel-like enclosure.

* * * * *